United States Patent
Sunil Kumar et al.

(10) Patent No.: US 10,585,436 B2
(45) Date of Patent: Mar. 10, 2020

(54) METHOD AND SYSTEM FOR REAL-TIME GENERATION OF REFERENCE NAVIGATION PATH FOR NAVIGATION OF VEHICLE

(71) Applicant: WIPRO LIMITED, Bangalore (IN)

(72) Inventors: Balaji Sunil Kumar, Bengaluru (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 88 days.

(21) Appl. No.: 15/939,759

(22) Filed: Mar. 29, 2018

(65) Prior Publication Data
US 2019/0250624 A1    Aug. 15, 2019

(30) Foreign Application Priority Data
Feb. 15, 2018    (IN) .............................. 201841005816

(51) Int. Cl.
*G01C 21/34*    (2006.01)
*G05D 1/02*    (2006.01)
(Continued)

(52) U.S. Cl.
CPC ........... *G05D 1/0217* (2013.01); *B60W 30/00* (2013.01); *G01C 21/26* (2013.01);
(Continued)

(58) Field of Classification Search
CPC .. G05D 1/0217; G05D 1/0088; G05D 1/0214; B60W 30/00; G01C 21/26; G01C 21/3415
(Continued)

(56) References Cited

U.S. PATENT DOCUMENTS

| 4,924,153 A | 5/1990 | Toru et al. |
| 9,718,466 B2 * | 8/2017 | Kim ..................... B60W 30/09 |

(Continued)

FOREIGN PATENT DOCUMENTS

| EP | 2280241 A2 | 2/2011 |
| WO | 2016195557 A1 | 12/2016 |

OTHER PUBLICATIONS

Extended European Search Report issued in the European Patent Office in counterpart European Application No. 18164925.2, dated Oct. 22, 2018, 9 pages.

(Continued)

*Primary Examiner* — Thomas G Black
*Assistant Examiner* — Wae L Louie
(74) *Attorney, Agent, or Firm* — Finnegan, Henderson, Farabow, Garrett & Dunner, LLP (57) ABSTRACT

Disclosed subject matter relates to a field of telematics that performs a method for generating reference navigation path in real-time for safe navigation of vehicle. A path generation system associated with the vehicle may receive a pre-generated navigation path, between source point and destination point. Further, the path generation system may identify a plurality of values corresponding to current condition of the vehicle, for a selected segment while the vehicle is navigating along the pre-generated navigation path. Further, an angular shift of the vehicle is determined based on the current condition of the vehicle and a reference navigation path is generated for the selected segment based on the angular shift. The present disclosure eliminates need for continuous monitoring and steering angle adjustment to align the vehicle with the pre-generated navigation path, thereby reducing power consumption by the vehicle and also minimizing jerks experienced by the vehicle.

18 Claims, 6 Drawing Sheets

(51) Int. Cl.
   *G05D 1/00*      (2006.01)
   *B60W 30/00*     (2006.01)
   *G01C 21/26*     (2006.01)
   *G06F 16/22*     (2019.01)
(52) U.S. Cl.
   CPC ....... *G01C 21/3415* (2013.01); *G05D 1/0088* (2013.01); *G05D 1/0214* (2013.01); *G05D 2201/0213* (2013.01); *G06F 16/22* (2019.01)
(58) Field of Classification Search
   USPC ....................................................... 701/411
   See application file for complete search history.

(56) References Cited

U.S. PATENT DOCUMENTS

| | | | |
|---|---|---|---|
| 2014/0046530 A1* | 2/2014 | Humphrey | B62D 15/025 701/26 |
| 2016/0096527 A1* | 4/2016 | D'Amato | F02D 41/0215 701/102 |
| 2017/0123429 A1* | 5/2017 | Levinson | G05D 1/0088 |
| 2019/0056739 A1* | 2/2019 | Sunil Kumar | G01C 21/30 |
| 2019/0063943 A1* | 2/2019 | Sunil Kumar | G01C 21/367 |
| 2019/0250624 A1* | 8/2019 | Sunil Kumar | G01C 21/26 |

OTHER PUBLICATIONS

Horst, J. et al., "Trajectory Generation for an On-Road Autonomous Vehicles", *NITS IR*, (2005), pp. 1-9.

\* cited by examiner

METHOD AND SYSTEM FOR REAL-TIME GENERATION OF REFERENCE NAVIGATION PATH FOR NAVIGATION OF VEHICLE

TECHNICAL FIELD

The present subject matter relates generally to field of telematics, and more particularly, but not exclusively to a method and a system for generating a reference navigation path in real-time for safe navigation of a vehicle.

BACKGROUND

Generally, vehicles make use of navigation path for navigating from a source point to a destination point. Nowadays, the navigation path is widely used in autonomous vehicle technology for navigating autonomous vehicles. The autonomous vehicle technology aims to reduce energy consumption, pollution, reduce frequency of crashes and congestion thereby providing increased road safety. The autonomous vehicles are the vehicles that are capable of sensing environment around them for moving on the road without any human intervention. The autonomous vehicles sense the environment with help of sensors configured to work in systems such as Light Detection and Ranging (LIDAR) system, image capturing devices, Global Positioning System (GPS) and the like.

Existing techniques provide a navigation path for the autonomous vehicles to traverse from the source point to the destination point, along with command velocities such as, linear, and angular velocity to follow a planned navigation path. As an example, few of the existing techniques, generate multiple trajectories of the navigation path based on geography and the sensors attached to the autonomous vehicle. Based on the dynamically occurring obstacles, these techniques may select the best trajectory among the multiple trajectories for navigation of the autonomous vehicle. Further, some existing techniques, may generate a navigation path for the autonomous vehicle based on velocity profile. A few other existing techniques generate a smooth trajectory that maintains uniformity in position, velocity and acceleration of the autonomous vehicle, within constraints of a lane.

However, the existing techniques fail to solve the problem related to deviation of the autonomous vehicle from the planned navigation path. The deviation may occur when the autonomous vehicle attempts to traverse along the planned navigation path. A few of the existing techniques, continuously monitor the autonomous vehicle and adjust steering angle to align the autonomous vehicle with the planned navigation path, when the deviation occurs. However, continuous adjustment of the steering angle throughout the journey results in excessive power drain from battery of the autonomous vehicle. Also, due to the continuous adjustment, the autonomous vehicle may experience frequent jerks while moving along the navigation path, resulting in an uncomfortable drive.

The information disclosed in this background of the disclosure section is only for enhancement of understanding of the general background of the disclosure and should not be taken as an acknowledgement or any form of suggestion that this information forms prior art already known to a person skilled in the art

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of generating a reference navigation path in real-time for safe navigation of a vehicle. The method includes receiving, by a path generation system associated with the vehicle, a pre-generated navigation path between a source point and a destination point, from one or more sources. Upon receiving the pre-generated navigation path, the path generation system identifies, in real-time, a plurality of values corresponding to current condition of the vehicle, for a selected segment among one or more segments in the pre-generated navigation path. The vehicle is configured to navigate along the pre-generated navigation path. Further, the path generation system determines an angular, shift of the vehicle from the selected segment of the pre-generated navigation path, by comparing the plurality of values corresponding to the current condition of the vehicle with pre-stored values. Finally, the path generation system generates the reference navigation path for the selected segment of the pre-generated navigation path based on the angular shift, for safe navigation of the vehicle.

Further, the present disclosure includes a path generation system generating a reference navigation path in real-time for safe navigation of a vehicle. The path generation system includes a processor and a memory communicatively coupled to the processor. The memory stores the processor-executable instructions, which, on execution, causes the processor to receive a pre-generated navigation path between a source point and a destination point, from one or more sources. Upon receiving the pre-generated navigation path, the processor identifies, in real-time, a plurality of values corresponding to current condition of the vehicle, for a selected segment among one or more segments in the pre-generated navigation path. The vehicle is configured to navigate along the pre-generated navigation path. Further, the processor determines an angular shift of the vehicle from the selected segment of the pre-generated navigation path, by comparing the plurality of values corresponding to the current condition of the vehicle with pre-stored values. Finally, the processor generates the reference navigation path for the selected segment of the pre-generated navigation path based on the angular shift, for safe navigation of vehicle.

Further, the present disclosure includes a non-transitory computer readable medium including instructions stored thereon that when processed by at least one processor causes a path generation system to perform operations comprising receiving a pre-generated navigation path between a source point and a destination point, from one or more sources. Upon receiving the pre-generated navigation path, the instructions cause the processor to identify, in real-time, a plurality of values corresponding to current condition of the vehicle, for a selected segment among one or more segments in the pre-generated navigation path. The vehicle is configured to navigate along the pre-generated navigation path. Further, the instructions cause the processor to determine an angular shift of the vehicle from the selected segment of the pre-generated navigation path, by comparing the plurality of values corresponding to the current condition of the vehicle with pre-stored values. Finally, the instructions cause the processor to generate the reference navigation path for the selected segment of the pre-generated navigation path based on the angular shift, for safe navigation of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating a reference navigation path in real-time for safe navigation of a vehicle. As an example, the vehicle may be at least one of an autonomous vehicle or a non-autonomous vehicle. A path generation system associated with the vehicle, may receive a pre-generated navigation path between a source point and a destination point from one or more sources. As an example, the one or more sources may include, but not limited to, an application related to maps such as a navigation application and a database storing static maps. While the vehicle may navigate along the pre-generated navigation path, the path generation system may select a segment among one or more segments in the pre-generated navigation path. In some embodiments, the segment may be generated dynamically. As an example, a part of the pre-generated navigation path which extends up to a distance such as 10 metres, 15 metres and the like, from a current position of the vehicle, may be selected as the segment. Alternatively, in some embodiments, the one or more segments may be pre-generated based on a predefined distance configured in the path generation system.

Further, the path generation system may identify a plurality of values corresponding to current condition of the vehicle, for the selected segment. In some embodiments, the plurality of values corresponding to the current condition of the vehicle may be determined using one or more sensors configured in the vehicle. As an example, the one or more sensors may include, but not limited to, image capturing sensors such as cameras, terrain condition detecting sensors, Global Positioning System (GPS) sensors, occupancy detection sensors, inertial measurement units, load detecting sensors and Light Detection and Ranging (LIDAR).

In some embodiments, the current condition of the vehicle may be measured based on one or more parameters. As an example, the one or more parameters may include, but not limited to, load condition of the vehicle, terrain condition where the vehicle is navigating and, wear and tear condition of the vehicle. In some embodiments, the wear and tear condition may indicate a form of depreciation which is assumed to occur eventually, even when the vehicle is properly maintained. As an example, the wear and tear condition may be measured with respect to broken/corroded parts of the vehicle, alterations made to the vehicle, mechanical/electrical maintenance of the vehicle, overall distance covered by the vehicle and the like. Further, the path generation system may compare the plurality of values corresponding to the current condition of the vehicle with pre-stored values to determine an angular shift of the vehicle from the selected segment of the pre-generated navigation path. In some embodiments, the pre-stored values may be generated by conducting a trial run of the vehicle under varying predefined conditions of the vehicle. In some other embodiments, the path generation system may update the pre-stored values eventually by self-learning. In some embodiments, each of the pre-stored values are associated with one or more pre-recorded angular shift values that are also recorded during the trial run conducted for the vehicle under varying predefined conditions of the vehicle.

Further, the path generation system may identify an intermediate path point among one or more path points in the selected segment. In some embodiments, only one intermediate path point may be selected for each segment. Upon identifying the intermediate path point, the path generation system may identify a new position for the intermediate path point based on the angular shift determined for the selected segment. Finally, the path generation system may curve fit co-ordinates of the new position of the intermediate path point to generate the reference navigation path. In some embodiments, the path generation system may generate the reference navigation path for the one or more segments until the destination point is reached.

In some embodiments, the reference navigation path generated based on the current condition of the vehicle in the present disclosure is basically an incorrect path. The vehicle while navigating in the incorrect path may deviate from the incorrect path due to natural tendency. In some embodiments, the natural tendency is defined as probability of the vehicle to be deviated from a base path at a certain angle, while moving at a certain speed, direction or time, when the vehicle is subjected to a certain condition. As an example, the vehicle may have the natural tendency to deviate towards left direction at an angle of 10 degrees when load of the vehicle exceeds 100 kg, instead of moving straight along the pre-generated navigation path. Therefore, the reference navigation path may be generated in accordance with the angular shift such that, when the vehicle navigates along the reference navigation path, due to the natural tendency the vehicle navigates along the pre-generated navigation path, which is the path along which the vehicle is actually intended to navigate.

Further, the reference navigation path generated in the present disclosure eliminates the need for continuous monitoring and steering angle adjustment to align the vehicle with the pre-generated navigation path, thereby reducing power consumption by the vehicle. Also, the reference navigation path generated in the present disclosure may provide a smooth navigation experience for the vehicle by minimizing jerks experienced by the vehicle.

A description of an embodiment with several components in communication with each other does not imply that all such components are required. On the contrary a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
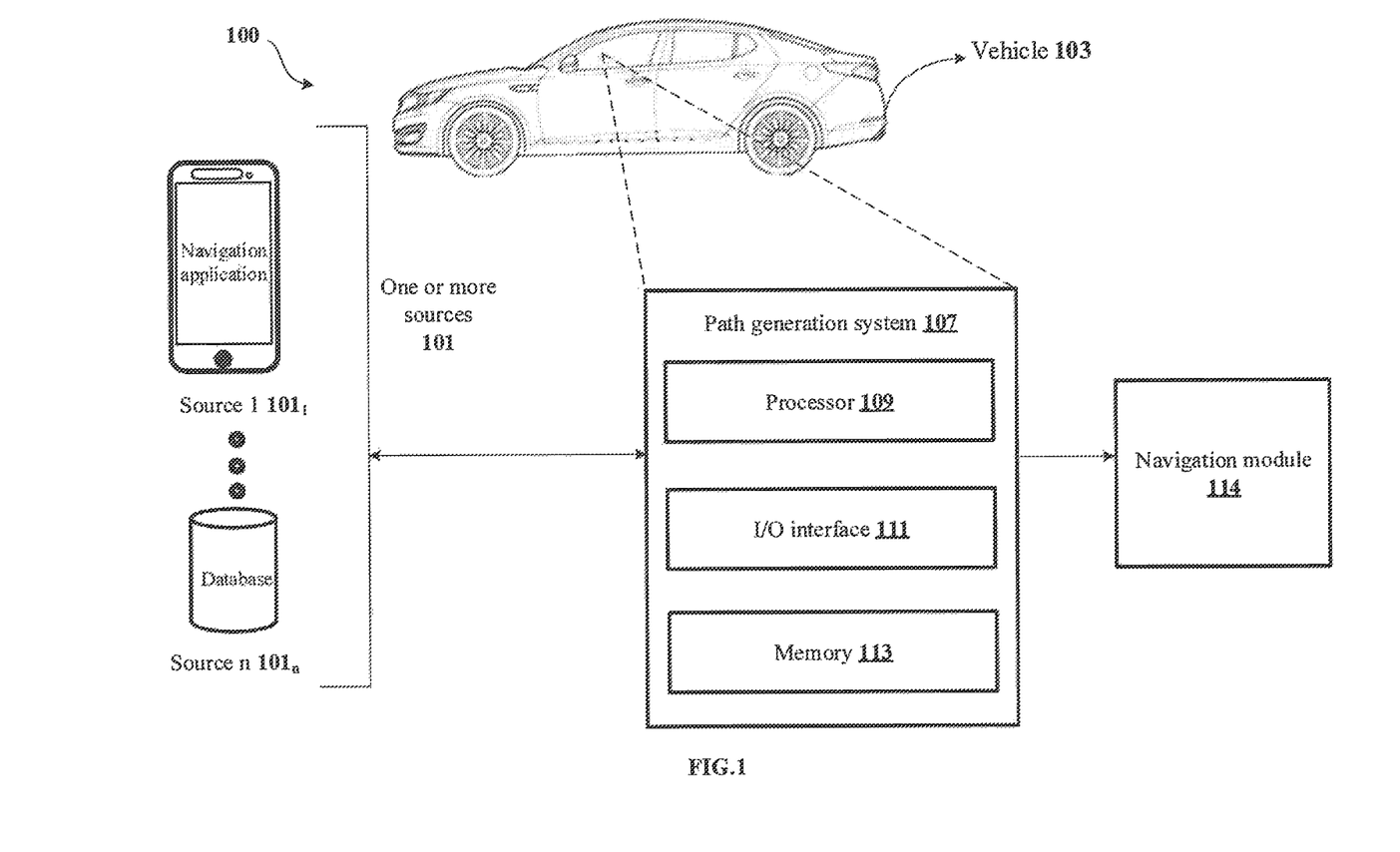
FIG. 1 shows an exemplary architecture for generating a reference navigation path in real-time for safe navigation of a vehicle in accordance with some embodiments of the present disclosure.

FIG. 1 shows an exemplary architecture for generating a reference navigation path in real-time for safe navigation of a vehicle in accordance with some embodiments of the present disclosure.

The architecture 100 includes one or more sources, source $101_1$ to source $101_n$ (collectively referred as one or more sources 101), a vehicle 103, a path generation system 107 and a navigation module 114. As an example, the one or more sources 101 may include, but not limited to, an application related to maps such as a navigation application and a repository storing static maps. In some embodiments, the one or more sources 101 may provide static maps generated using Light Detection and Ranging (LIDAR). In some embodiments, the one or more sources 101 may be associated with the path generation system 107 via a communication network (not shown in FIG. 1). As an example, the communication network may include a wired communication network or a wireless communication network. In some embodiments, the path generation system 107 may be configured within the vehicle 103 as shown in the FIG. 1. In some other embodiments, the path generation system 107 may be remotely associated with the vehicle 103 via the wireless communication network. In some embodiments, the vehicle 103 may be an autonomous vehicle or a non-autonomous vehicle. As an example, the vehicle 103 may be a bike, a car, a truck, a bus and the like.

The path generation system 107 includes a processor 109, an Input/Output (I/O) interface 111 and a memory 113. The I/O interface 111 may be configured to receive a pre-generated navigation path between a source point and a destination point, from the one or more sources 101. The processor 109 may provide reference navigation path to the navigation module 114 through the I/O interface 111. In some embodiments, the one or more sources 101 may obtain the pre-generated navigation path using one or more pre-defined standard techniques such as Dijkstra's algorithm, A-star algorithm and the like, upon receiving the source point and the destination point. In some embodiments, the source point and the destination point may be provided as inputs to the path generation system 107 by a user associated with the path generation system 107. Further, the processor 109 may store the pre-generated navigation path in the memory 113 coupled with the processor 109.

Upon receiving the pre-generated navigation path, the processor 109 may select a segment among one or more segments in the pre-generated navigation path, while the vehicle 103 is navigating along the pre-generated navigation path. In some embodiments, the processor 109 may generate the segments dynamically. As an example, a part of the pre-generated navigation path which extends up to a distance such as 10 metres, 15 metres and the like, from a current position of the vehicle 103, may be selected as the segment. Alternatively, in some embodiments, the processor 109 may pre-generate the one or more segments based on a predefined distance configured in the path generation system 107. Further, the processor 109 may identify a plurality of values corresponding to current condition of the vehicle 103, for the selected segment. In some embodiments, the plurality of values corresponding to the current condition of the vehicle 103 may be determined using one or more sensors configured in the vehicle 103. As an example, the one or more sensors may include, but not limited to, image capturing sensors such as cameras, terrain condition detecting sensors, Global Positioning System (GPS) sensors, occupancy detection sensors, inertial measurement units, load detecting sensors and Light Detection and Ranging (LIDAR).

In some embodiments, the processor 109 may measure the current condition of the vehicle 103 based on one or more parameters. As an example, the one or more parameters may include, but not limited to, load condition of the vehicle 103, terrain condition where the vehicle 103 is navigating and, wear and tear condition of the vehicle 103. Further, the processor 109 may compare the plurality of values corresponding to the current condition of the vehicle 103 with pre-stored values to determine an angular shift of the vehicle 103 from the selected segment of the pre-generated navigation path. In some embodiments, the pre-stored values may be generated by conducting a trial run of the vehicle 103 under varying predefined conditions of the vehicle 103. In some embodiments, the varying predefined condition of the vehicle may be different combinations of the one or more parameters. As an example, the trial run of the vehicle 103 may be conducted under the predefined condition where load of the vehicle 103 is 100 kg and the terrain condition includes a slope of 25 degrees. In some embodiments, each of the pre-stored values may be associated with one or more pre-recorded angular shift values. Considering the above mentioned exemplary predefined condition, an exemplary angular shift value associated with the exemplary predefined condition may be +/−20 degree.

Further, the processor 109 may generate a reference navigation path for the selected segment of the pre-generated navigation path based on the angular shift, for safe navigation of the vehicle 103. In some embodiments, the processor 109 may generate the reference navigation path for the one or more segments until the destination point is reached.

Upon generating the reference navigation path, the processor 109 may provide the reference navigation path to the navigation module 114 associated with the path generation system 107 for navigating the vehicle 103. In some embodiments, the navigation module 114 may be configured in the vehicle 103. The navigation module 114 may determine a command velocity for the vehicle 103 based on dynamic data received for navigating the vehicle 103 along the reference navigation path. In some embodiments, the vehicle 103 navigating through the reference navigation path may shift to the pre-generated navigation path due to the current condition of the vehicle 103.

Figure 2A:
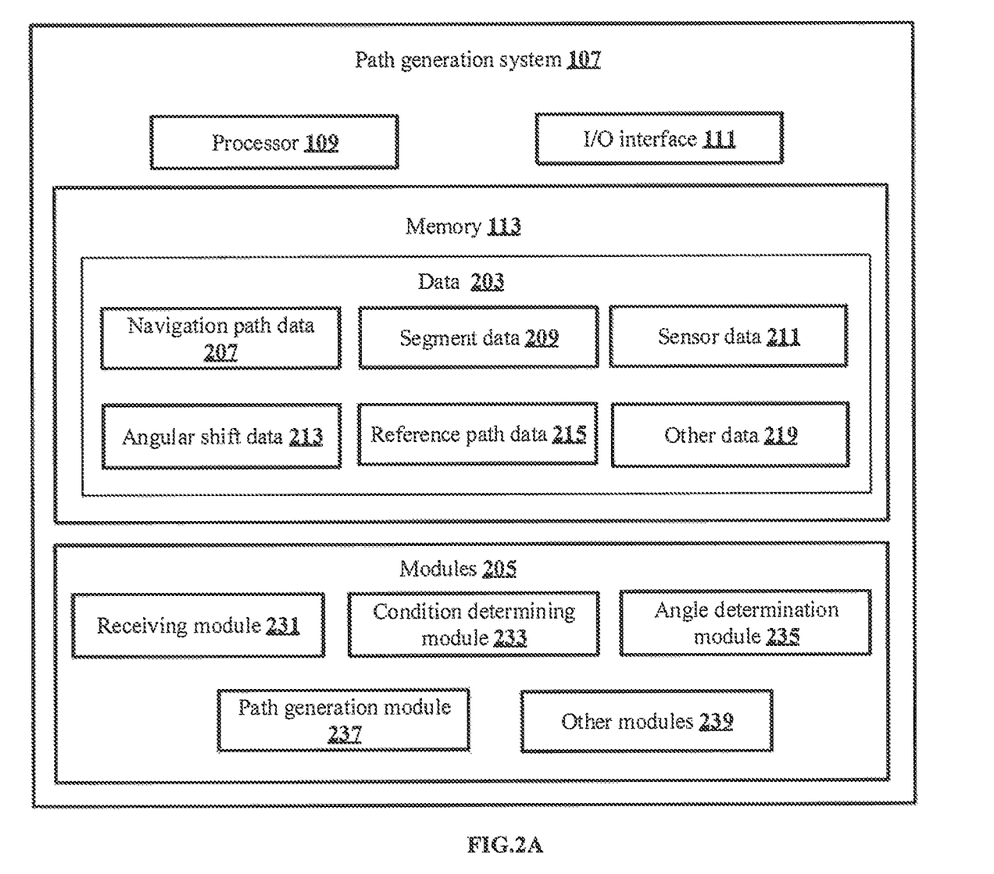
FIG. 2A shows a detailed block diagram of a path generation system for generating a reference navigation path in real-time for safe navigation of a vehicle in accordance with some embodiments of the present disclosure.

FIG. 4A shows a detailed block diagram of a path generation system for generating a reference navigation path in real-time for safe navigation of a vehicle in accordance with some embodiments of the present disclosure.

In some implementations, the path generation system 107 may include data 203 and modules 205. As an example, the data 203 is stored in a memory 113 configured in the path generation system 107 as shown in the FIG. 2A. In one embodiment, the data 203 may include navigation path data 207, segment data 209, sensor data 211, angular shift data 213, reference path data 215 and other data 219. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 219 may store data, including temporary data and temporary files, generated by the modules 205 for performing the various functions of the path generation system 107.

In some embodiments, the data 203 stored in the memory 113 may be processed by the modules 205 of the path generation system 107. The modules 205 may be stored within the memory 113. In an example, the modules 205 communicatively coupled to the processor 109 configured in the path generation system 107, may also be present outside the memory 113 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 231, a condition determining module 233, an angle determination module 235, a path generation module 237 and other modules 239. The other modules 239 may be used to perform various miscellaneous functionalities of the path generation system 107. It will be appreciated that such aforementioned modules 205 may be represented as a single module or a combination of different modules.

In some embodiments, the receiving module 231 may receive a pre-generated navigation path between a source point and a destination point, from one or more sources 101 when the vehicle 103 is about to start journey from the source point to the destination point. The pre-generated navigation path along with the source point and the destination point may be stored as the navigation path data 207. As an example, the one or more sources 101 may include, but not limited to, an application related to maps such as a navigation application and a repository storing static maps. In some embodiments, the one or more sources 101 may provide static maps generated using Light Detection and Ranging (LIDAR).

In some embodiments, the condition determining module 233 may identify a plurality of values corresponding to current condition of the vehicle 103, for a segment selected among one or more segments. The condition determining module 233 may select the segment among the one or more segments in the pre-generated navigation path, while the vehicle 103 is navigating along the pre-generated navigation path. In some embodiments, the condition determining module 233 may generate the segments dynamically. Alternatively, in some embodiments, the condition determining module 233 may pre-generate the one or more segments based on a predefined distance configured in the path generation system 107. The one or more segments may be stored as the segment data 209. As an example, the segment data 209 may include details of number of segments in the pre-generated navigation path, the distance of each of the one or more segments and the like. The condition determining module 233 may measure the current condition of the vehicle 103 based on one or more parameters. As an example, the one or more parameters may include, but not limited to, load condition of the vehicle 103, terrain condition where the vehicle 103 is navigating and, wear and tear condition of the vehicle 103. Further, the condition determining module 233 may determine plurality of values corresponding to the one or more parameters using one or more sensors configured in the vehicle 103. As an example, the one or more sensors may include, but not limited to, image capturing sensors such as cameras, terrain condition detecting sensors, Global Positioning System (GPS) sensors, occupancy detection sensors, inertial measurement units, load detecting sensors and Light Detection and Ranging (LIDAR). Data received from the one or more sensors may be stored as the sensor data 211.

In some embodiments, the angle determination module 235 may determine an angular shift of the vehicle 103 from the selected segment of the pre-generated navigation path. The angle determination module 235 may compare the plurality of values corresponding to current condition of the vehicle 103 with pre-stored values corresponding to pre-defined conditions of the vehicle 103. In some embodiments, the pre-stored values may be generated by conducting a trial run of the vehicle 103 under varying predefined conditions of the vehicle 103. In some embodiments, each of the pre-stored values are associated with one or more pre-recorded angular shift values. The pre-stored values and the determined angular shift may be stored as the angular shift data 213. Further to the comparison, the angle determination module 235 may select the angular shift value corresponding to each of the one or more parameters, based on the current condition of the vehicle 103. Furthermore, the angle determination module 235 may determine the angular shift of the vehicle 103 using the below Equation 1.

$$\text{Angular shift}(\theta) = \theta_1 + \theta_2 + \theta_3 \cdots + \theta_N \quad \text{Equation 1}$$

In the above Equation 1, $\theta_1$ indicates angular shift corresponding to the parameter 1;

$\theta_2$ indicates angular shift corresponding to the parameter 2;

$\theta_3$ indicates angular shift corresponding to the parameter 3; and $\theta_N$ indicates angular shift corresponding to the parameter N.

In some embodiments, the path generation module 237 may generate a reference navigation path for the selected segment of the pre-generated navigation path based on the angular shift, for safe navigation of the vehicle 103. In some embodiments, to generate the reference navigation path, the path generation module 237 may initially identify an intermediate path point among one or more path points in the selected segment. In some embodiments, only one intermediate path point may be selected for each segment. Upon identifying the intermediate path point, the path generation module 237 may identify a new position for the intermediate path point based on the angular shift determined for the selected segment. In some embodiments, the path generation module 237 may identify a new position far the intermediate path point using the below mentioned Equation 2 and Equation 3.

$$X_3 = X_1 - [1/\tan(\Phi)] * (Y_1 - Y_3) \quad \text{Equation 2}$$

In the above Equation 2, $X_3$ and $Y_3$ are co-ordinates of the new position of the intermediate path point;

$X_1$ and $Y_1$ are co-ordinates of current position of the vehicle 103; and $\Phi$ is an angle that determines slope with respect to orientation of vehicle 103.

$$X_3 = X_2 - [1/\tan(\theta - \Phi)] * (Y_2 - Y^3) \quad \text{Equation 3}$$

In the above Equation 3, $X_3$ and $Y_3$ are co-ordinates of the new position of the intermediate path point;

$X_2$ and $Y_2$ are co-ordinates of the intermediate path point of the segment;

$\Phi$ is an angle that determines slope with respect to orientation of vehicle 103; and $\theta$ is angular shift of the vehicle 103.

In some embodiments, the path generation module 237 may generate the co-ordinates for the new position of the intermediate path point by solving Equation 2 and Equation 3. Finally, the path generation module 237 may curve fit the co-ordinates of the new position of the intermediate path point to generate the reference navigation path for the selected segment. Similarly, the path generation module 237 may generate the reference navigation path for the one or more segments until the destination point is reached. In some embodiments, the reference navigation path and the new position of the intermediate points may be stored as the reference path data 215.

Upon generating the reference navigation path, the path generation module 237 may provide the reference navigation path to a navigation module 114 associated with the path generation system 107 for navigating the vehicle 103. In some embodiments, the navigation module 114 may be configured in the vehicle 103. The navigation module 114 may determine a command velocity for the vehicle 103 based on dynamic data received for navigating the vehicle 103 along the reference navigation path. As an example, the dynamic data may include, but not limited to, data related to one or more obstacles appearing in real-time when the vehicle 103 is navigating along the reference navigation path and data related to terrain associated with the reference navigation path. When the vehicle 103 is navigating along the reference navigation path due to current condition of the vehicle 103 there may be a shift from the reference navigation path to the pre-generated navigation path, resulting in movement of the vehicle 103 along the pre-generated navigation path as originally intended.

Henceforth, the process of generating a reference navigation path in real-time for safe navigation of a vehicle 103 is explained with the help of one or more examples for better understanding of the present disclosure. However, the one or more examples should not be considered as limitation of the present disclosure.

Figure 2B:
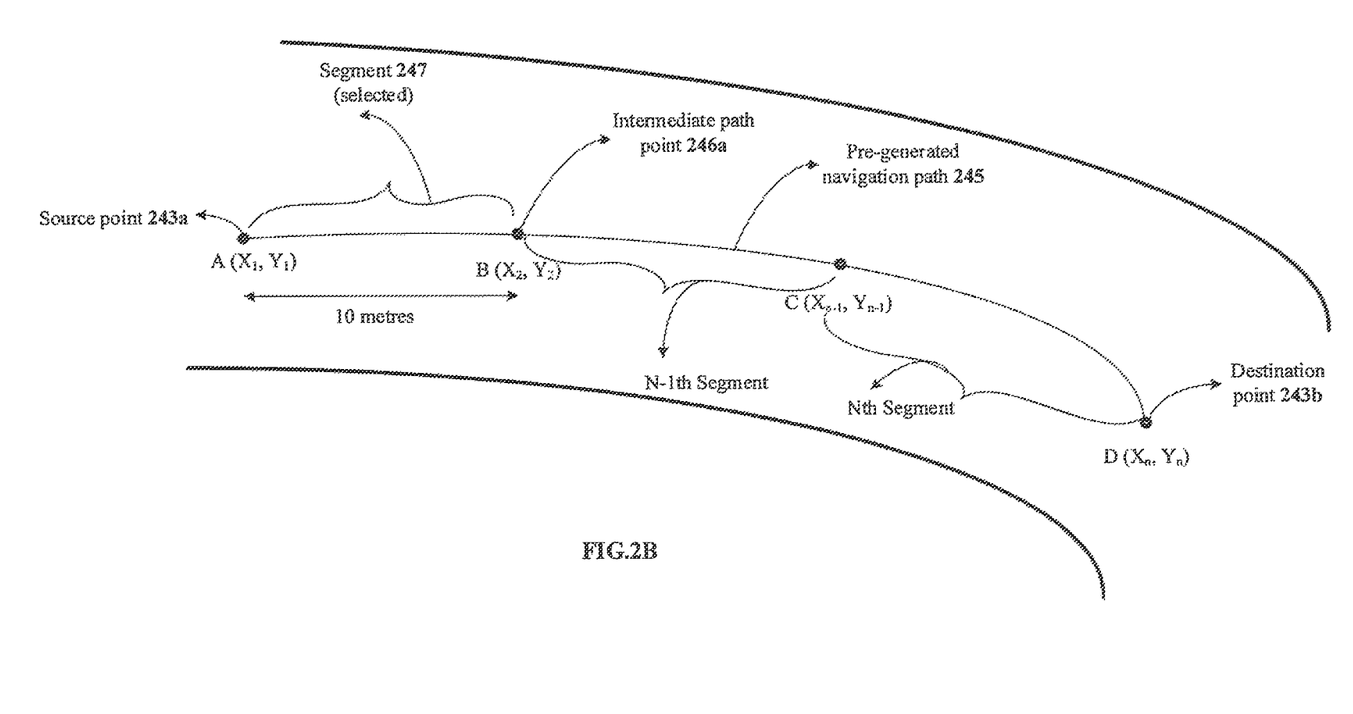
FIG. 2B and FIG. 2C show an exemplary representation of a pre-generated navigation path and a reference navigation path respectively, in accordance with some embodiments of the present disclosure.

Consider an exemplary scenario as shown in the FIG. 2B, where the vehicle 103 intends to travel from the source point 243*a* to the destination point 243*b* through the pre-generated navigation path 245. Consider an exemplary intermediate path point 246*a* for the selected segment 247 as shown in the FIG. 2B. Length of the selected segment 247 is 10 metres as shown in the FIG. 2B. Further, as shown in the FIG. 2B, co-ordinates A $(X_1, Y_1)$ of the source point 243*a* may be (5,2) and co-ordinates of the intermediate path point B $(X_2, Y_2)$ may be (15,10).

Consider, the current condition of the vehicle 103 with respect to the one or more parameters is determined to be:

Load condition of the vehicle 103 –100 Kg

Terrain condition of a road where the vehicle 103 is navigating:

Slope of the road –5 degree

Road curvature –40 degree

TABLE 2

| Pre-Condition: Load condition for a Plane road for a straight stretch of 10 meter | |
|---|---|
| Load | Angular shift |
| 0 | +/−5 degree |
| 50 kg | +/−10 degree |
| 80 kg | +/−12 degree |
| 100 kg | +/−15 degree |
| 120 kg | +/−20 degree |
| 150 kg | +/−25 degree |

Further, consider the pre-stored values corresponding to the predefined conditions of the vehicle 103 are as shown in the below Tables 2, 3 and 4.

TABLE 3

| Pre-Condition: No load for a straight stretch of 10 meter | |
|---|---|
| Slope/10 meter | Angular shift |
| 0 degree | +/−0 degree |
| +5 degree | +/−5 degree |
| +10 degree | +/−5 degree |
| +15 degree | +/−8 degree |

TABLE 3-continued

Pre-Condition: No load for a
straight stretch of 10 meter

| Slope/10 meter | Angular shift |
|---|---|
| +20 degree | +/−10 degree |
| +25 degree | +/−12 degree |
| −25 degree | +/−15 degree |
| −20 degree | +/−10 degree |
| −15 degree | +/−8 degree |
| −10 degree | +/−5 degree |
| −5 degree | +/−5 degree |

TABLE 4

Pre-Condition: Plane road, No load and a
fixed road curvature for 10 metre

| Fixed Road curvature for 10 metre | Angular shift |
|---|---|
| +/−10 degree | +/−5 degree |
| +/−20 degree | +/−10 degree |
| +/−30 degree | +/−15 degree |
| +/−40 degree | +/−20 degree |

Upon comparing the current condition of the vehicle 103 with the pre-stored values, the angular shift value corresponding to load condition 100 Kg is +/−15 degree, the angular shift value corresponding to terrain condition of the vehicle 103 i.e. with respect to slope of the road is +/−5 degree and with respect to road curvature is +/−20 degree.

Therefore, using the Equation 1, the angular shift is (15+5+20)=40 degree, i.e. θ=40 degree.

Therefore, the path generation system 107 should compensate the angular shift of 40 degrees for the selected segment 247. If the angular shift is not compensated, the vehicle 103 may navigate along a deviated path 248 as shown in the FIG. 2C, instead of navigating along the pre-generated navigation path 245. Point B" in the FIG. 2C indicates a deviated path point 246b present on the deviated path 248 for the intermediate path point 246a, and to compensate the angular shift, the path generation system 107 may determine a new position of the intermediate path point 246a using the Equations 2 and 3 for which angle Φ that determines slope with respect to orientation of vehicle 103 is considered as shown in the FIG. 2C. Consider Φ=25 degree. Therefore, by substituting the values of θ, Φ, A ($X_1$, $Y_1$) and B ($X_2$, $Y_2$) in Equations 2 and 3, and by further solving the Equations 2 and 3, the path generation system 107 may determine the new position of the intermediate path point 246a, which is represented by B' ($X_3$, $Y_3$) 246c as shown in the FIG. 2C. Further, the path generation system 107 curve fits the points A ($X_1$, $Y_1$) 243a and B' ($X_3$, $Y_3$) 246c to generate a reference navigation path 251 for the selected segment 247. Similarly, as shown in the FIG. 2B, new positions of intermediate path points C ($X_{n-1}$, $Y_{n-1}$) and D ($X_n$, $Y_n$) belonging to the n−$1^{th}$ segment 249 and $n^{th}$ segment 250 are also determined to generate the reference navigation path 251 (as shown in the FIG. 2C) from the source point 243a to the destination point 243b.

Figure 2C:
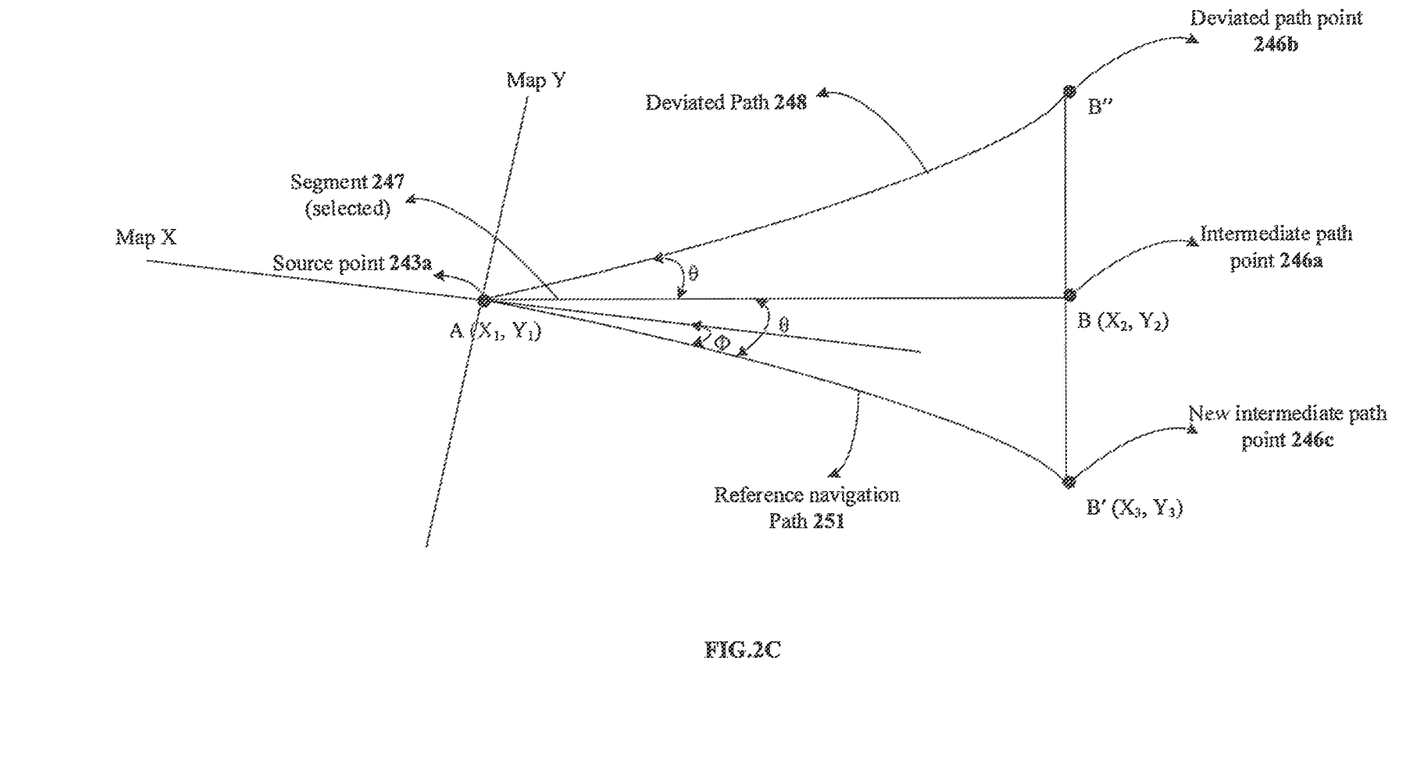

Therefore, when the vehicle 103 navigates along the reference navigation path 251, the vehicle 103 compensates the angular shift due to natural tendency that occurs from the current condition of the vehicle 103, because of which the vehicle 103 would navigate correctly on the pre-generated navigation path 245 as intended instead of the deviated path 248.

Figure 3:
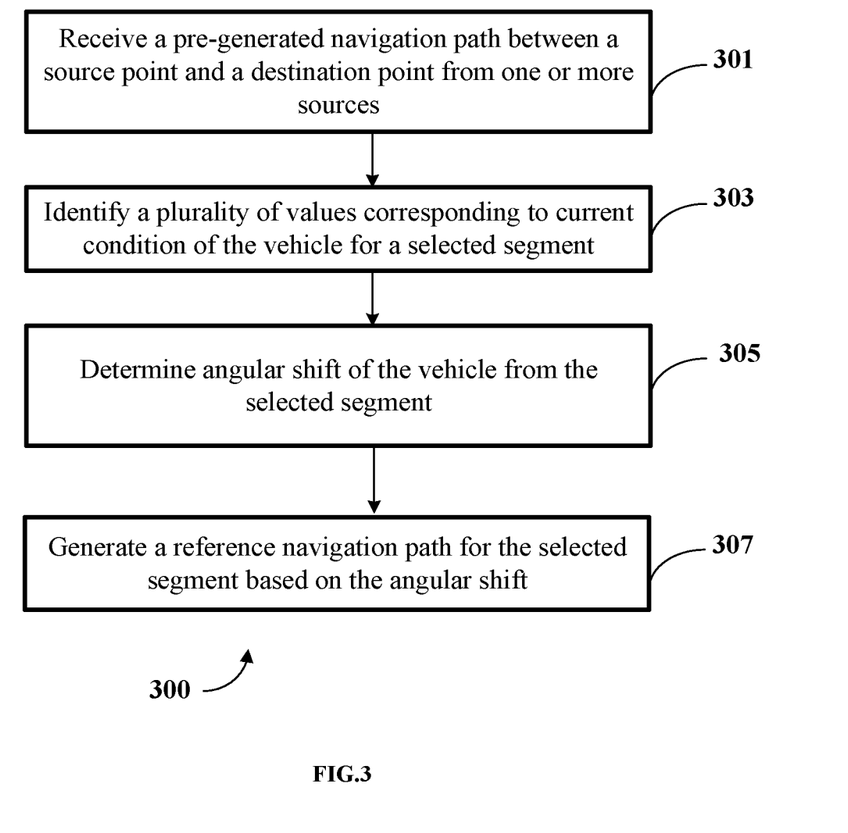
FIG. 3 shows a flowchart illustrating a method of generating a reference navigation path in real-time for safe navigation of a vehicle in accordance with some embodiments of the present disclosure.

FIG. 3 shows a flowchart illustrating a method of generating a reference navigation path in real-time for safe navigation of a vehicle in accordance with some embodiments of the present disclosure.

As illustrated in FIG. 3, the method 300 includes one or more blocks illustrating a method of generating a reference navigation path in real-time for safe navigation of a vehicle 103. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the path generation system 107, a pre-generated navigation path between a source point and a destination point from one or more sources 101. As an example, the one or more sources 101 may include, but not limited to, an application related to maps such as a navigation application and a database storing static maps. The one or more sources 101 may obtain the pre-generated navigation path using one or more predefined standard techniques such as Dijkstra's algorithm, A-star algorithm and the like, upon receiving the source point and the destination point.

At block 303, the method 300 may include identifying, by the processor 109, a plurality of values corresponding to current condition of the vehicle 103, for a selected segment among one or more segments in the pre-generated navigation path. In some embodiments, the vehicle 103 is configured to navigate along the pre-generated navigation path.

At block 305, the method 300 may include, determining, by the processor 109, an angular shift of the vehicle 103 from the selected segment of the pre-generated navigation path, by comparing the plurality of values corresponding to the current condition of the vehicle 103 with pre-stored values. In some embodiments, the processor 109 may generate the pre-stored values by conducting a trial run of the vehicle 103 under varying predefined conditions of the vehicle 103. In some embodiments, condition of the vehicle 103 i.e. the current condition and the predefined condition, may be measured based on one or more parameters. As an example, the one or more parameters may include, but not limited to, load condition of the vehicle 103, terrain condition where the vehicle 103 is navigating and, wear and tear condition of the vehicle 103.

At block 307, the method 300 may include, generating, by the processor 109, the reference navigation path by identifying a new position for an intermediate path point of the selected segment of the pre-generated navigation path based on the angular shift, for safe navigation of the vehicle 103. In some embodiments, the processor 109 may identify an intermediate path point among one or more path points in the selected segment. In some embodiments, only one intermediate path point may be selected for each segment. Upon identifying the intermediate path point, the processor 109 may identify a new position for the intermediate path point based on the angular shift determined for the selected segment. Finally, the processor 109 may curve fit co-ordinates of the new position of the intermediate path point to generate the reference navigation path. In some embodiments, the path generation system 107 may generate the reference navigation path for the one or more segments until the destination point is reached.

Figure 4:
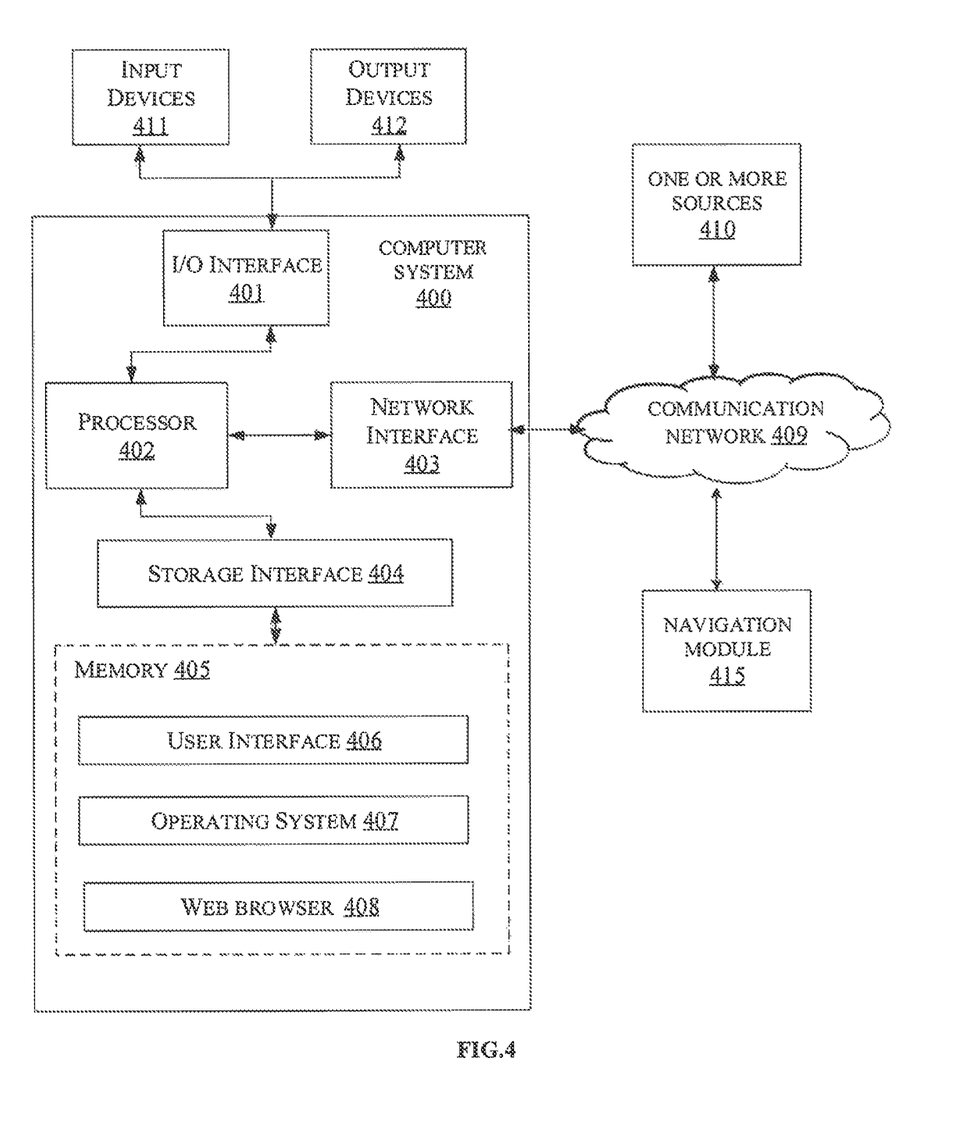
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be path generation system 107 that is used for generating a reference navigation path in real-time for safe navigation of a vehicle 103. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more sources 410 (410$_a$ up to 410$_n$), and a navigation module 415. The communication network 409 can be implemented as one of the different types of networks, such as intranet or Local Area Network (LAN), Closed Area Network (CAN) and such within the vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sources 410 may include, but not limited to, a navigation application, an application related to maps and a database comprising static maps. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (MAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure ARE Illustrated Herein

The present disclosure provides a method and a system for generating a reference navigation path in real-time for safe navigation of a vehicle.

The reference navigation path generated based on current condition of the vehicle in the present disclosure is basically an incorrect path that causes the vehicle to navigate correctly along the pre-generated navigation path due to natural tendency of the vehicle.

The reference navigation path generated in the present disclosure eliminates the need for continuous monitoring and steering angle adjustment to align the vehicle with the pre-generated navigation path, thereby reducing power consumption by the vehicle.

The reference navigation path is generated in the present disclosure by considering vehicle profile data. Therefore, the reference navigation path provides a smooth and safe navigation experience for the vehicle by minimizing jerks experienced by the vehicle.

A description of an embodiment with several components in communication with each other does not imply that all such components are required. On the contrary a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a reference navigation path in real-time for safe navigation of a vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 101 | One or more sources |
| 103 | Vehicle |
| 107 | Path generation system |
| 109 | Processor |
| 111 | I/O interface |
| 113 | Memory |
| 114 | Navigation module |
| 203 | Data |
| 205 | Modules |
| 207 | Navigation path data |
| 209 | Segment data |
| 211 | Sensor data |
| 213 | Angular shift data |
| 215 | Reference path data |
| 219 | Other data |
| 231 | Receiving module |
| 233 | Condition determining module |
| 235 | Angle determination module |
| 237 | Path generation module |
| 239 | Other modules |
| 243a | Source point |
| 243b | Destination point |
| 245 | Exemplary pre-generated navigation path |
| 246a | Intermediate path point |
| 246b | Deviated path point |
| 246c | New intermediate path point |
| 247 | Segment (selected) |
| 248 | Deviated path |
| 249 | N-$1^{th}$ Segment |
| 250 | $N^{th}$ Segment |
| 251 | Exemplary reference navigation path |

| Reference Number | Description |
| --- | --- |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 410 | One or more sources of the exemplary computing system |
| 411 | Input devices |
| 412 | Output devices |
| 415 | Navigation module of the exemplary computing system |

What is claimed is:

1. A method of generating a reference navigation path in real-time for safe navigation of a vehicle (103), the method comprising:
receiving, by a path generation system (107) associated with the vehicle (103), a pre-generated navigation path between a source point and a destination point, from one or more sources (101);
identifying, in real-time, by the path generation system (107), a plurality of values corresponding to current condition of the vehicle (103), for a selected segment among one or more segments in the pre-generated navigation path, wherein the vehicle (103) is configured to navigate along the pre-generated navigation path;
determining, by the path generation system (107), an angular shift of the vehicle (103) from the selected segment of the pre-generated navigation path, by comparing the plurality of values corresponding to the current condition of the vehicle (103) with pre-stored values; and
generating, by the path generation system (107), the reference navigation path for the selected segment of the pre-generated navigation path based on the angular shift, for safe navigation of the vehicle (103).

2. The method as claimed in claim 1, wherein the pre-stored values are generated by conducting a trial run of the vehicle (103) under varying predefined conditions of the vehicle (103).

3. The method as claimed in claim 2, wherein the pre-stored values corresponding to the predefined conditions of the vehicle (103) are associated with one or more pre-recorded angular shift values.

4. The method as claimed in claim 2, wherein condition of the vehicle (103) is measured based on one or more parameters comprising at least one of load condition of the vehicle (103), terrain condition where the vehicle (103) is navigating and, wear and tear condition of the vehicle (103).

5. The method as claimed in claim 1, wherein the plurality of values corresponding to the current condition of the vehicle (103) are determined using one or more sensors configured in the vehicle (103).

6. The method as claimed in claim 1, wherein generating the reference navigation path, comprises:
identifying an intermediate path point among one or more path points in the selected segment; and
identifying a stew position for the intermediate path point based on the angular shift, wherein co-ordinates of the new position of the intermediate path point is curve fitted to generate the reference navigation path.

7. The method as claimed in claim 1 further comprises generating the reference navigation path for the one or more segments until the destination point is reached.

8. The method as claimed in claim 1 further comprises providing, by the path generation system (107), the reference navigation path to a navigation module associated with the path generation system (107) for safe navigation of the vehicle (103), wherein the vehicle (103) navigating through the reference navigation path shifts to the pre-generated navigation path due to the current condition of the vehicle (103).

9. The method as claimed in claim 1, wherein the vehicle (103) is at least one of autonomous vehicle and a non-autonomous vehicle.

10. A path generation system (107) for generating a reference navigation path in real-time for safe navigation of a vehicle (103), system comprising:
a processor (109); and
a memory (113) communicatively coupled to the processor (109), wherein the memory (113) stores the processor-executable instructions, which, on execution, causes the processor (109) to:
receive a pre-generated navigation path between a source point and a destination point, from one or more sources (101);
identify, in real-time, a plurality of values corresponding to current condition of the vehicle (103), for a selected segment among one or more segments in the pre-generated navigation path, wherein the vehicle (103) is configured to navigate along the pre-generated navigation path;
determine an angular shift of the vehicle (103) from the selected segment of the pre-generated navigation path, by comparing the plurality of values corresponding to the current condition of the vehicle (103) with pre-stored values; and
generate the reference navigation path for the selected segment of the pre-generated navigation path based on the angular shift, for safe navigation of the vehicle (103).

11. The path generation system (107) as claimed in claim 10, wherein the processor (109) generates the pre-stored values by conducting a trial run of the vehicle (103) under varying predefined conditions of the vehicle (103).

12. The path generation system (107) as claimed in claim 11, wherein the pre-stored values corresponding to the predefined conditions of the vehicle (103) are associated with one or more pre-recorded angular shift values.

13. The path generation system (107) as claimed in claim 11, wherein the processor (109) measures condition of the vehicle (103) based on one or more parameters comprising at least one of load condition of the vehicle (103), terrain condition where the vehicle (103) is navigating and, wear and tear condition of the vehicle (103).

14. The path generation system (107) as claimed in claim 10, wherein the processor (109) determines the plurality of values corresponding to the current condition of the vehicle (103) using one or more sensors configured in the vehicle (103).

15. The path generation system (107) as claimed in claim 10, wherein, to generate the reference navigation path, the processor (109) is configured to:
identify an intermediate path point among one or more path points in the selected segment; and identify a new position for the intermediate path point based on the angular shift, wherein co-ordinates of the new position of the intermediate path point is curve fitted to generate the reference navigation path.

16. The path generation system (107) as claimed in claim 10, wherein the processor (109) is further configured to generate the reference navigation path for the one or more segments until the destination point is reached.

17. The path generation system (107) as claimed in claim 10 wherein the processor (109) is further configured to provide the reference navigation path to a navigation module associated with the path generation system (107) for safe navigation of the vehicle (103), wherein the vehicle (103) navigating through the reference navigation path shifts to the pre-generated navigation path due to the current condition of the vehicle (103).

18. A non-transitory computer readable medium including instructions stored thereon that when processed by at least one processor (109) causes a path generation system (107) to perform operations comprising:

receiving a pre-generated navigation path between a source point and a destination point, from one or more sources (101);

identifying, in real-time, a plurality of values corresponding to current condition of the vehicle (103), for a selected segment among one or more segments in the pre-generated navigation path, wherein the vehicle (103) is configured to navigate along the pre-generated navigation path;

determining an angular shift of the vehicle (103) from the selected segment of the pre-generated navigation path, by comparing the plurality of values corresponding to the current condition of the vehicle (103) with pre-stored values; and generating the reference navigation path for the selected segment of the pre-generated navigation path based on the angular shift, for safe navigation of the vehicle (103).

* * * * *